United States Patent Office
3,716,591
Patented Feb. 13, 1973

3,716,591
OLEFIN HALOGENATION
Donnie G. Brady, Bartlesville, Okla., assignor to
Phillips Petroleum Company
No Drawing. Filed Mar. 13, 1969, Ser. No. 807,067
Int. Cl. C07c 17/02, 19/02, 23/00
U.S. Cl. 260—648 R
10 Claims

ABSTRACT OF THE DISCLOSURE

Halogenated olefinic compounds are formed by reacting an olefinic compound with a halogen in the presence of a non-polar diluent, a Lewis acid, and only a complex forming amount of a polar organic compound, the halogenated product being useful as a flame retardant in polyolefins.

---

This invention relates to a process for the halogenation of olefinic compounds.

The synthesis of halogenated compounds has not been satisfactory in certain ways. For example, if greater than complex forming amounts of polar diluents such as alcohols are employed with a Lewis acid such as aluminum chloride to halogenate an olefin, relatively poor yields of pure halogenated materials are produced. Further, the product is contaminated with amounts of analogs thereof wherein one or more alkoxy radicals are attached to carbon atoms of the product. Such analogs are highly undesirable in that they form dark colored products and cause corrosion of extruder screws and the like when the halogenated hydrocarbon product is subsequently employed as a flame retarder in a polyolefin. If alternative means of synthesis are employed wherein a Lewis acid such as aluminum chloride is employed with a non-polar diluent such as chloroform, dark colored complexes are often formed from the aluminum chloride reacting with the olefinic compound, which imparts undesirable color to the product. These problems are solved by the process of this invention as good yields of high purity halogenated compounds are produced thereby.

It has now been found that olefins can be halogenated by contacting the olefin with a halogen in a non-polar diluent in the presence of a catalyst which is formed by admixing a Lewis acid and a catalytic amount of a polar organic compound.

Accordingly, an object of this invention is to provide a process for the halogenation of olefinic compounds.

Other aspects, objects, and advantages of this invention are apparent from a study of this disclosure and the appended claims.

Any olefinic compound that contains 1–5 olefinic carbon-carbon double bonds which are not conjugated, 2–50 carbon atoms, and as many as five moieties selected from

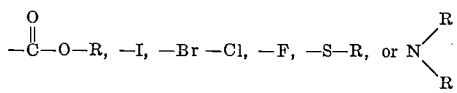

wherein R can be alkyl, cycloalkyl or combinations thereof having in the range of 1–10 carbon atoms, and that is otherwise hydrogen saturated but which can have up to four benzene rings can be halogenated according to the process of this invention. Specific examples are 1,2-bis(3-cyclohexenyl)ethylene;
1,2-bis(1-methyl-3-cyclohexenyl)ethylene;
1,2-bis(2-methyl-3-cyclohexenyl)ethylene;
1,2-bis(3-ethyl-3-cyclohexenyl)ethylene;
1,2-bis(4-methyl-3-cyclohexenyl)ethylene;
1,2-bis(5-ethyl-3-cyclohexenyl)ethylene;
1,2-bis(6,6-dimethyl-3-cyclohexenyl)ethylene;
3,4-bis(3-cyclohexenyl)-3-hexene;
1,2-bis(2,6-dimethyl-3-cyclohexenyl)ethylene;
2,3-bis(3-methyl-3-cyclohexenyl)-2-butene;
1,2-bis(1,3-dimethyl-3-cyclohexenyl)ethylene;
2,3-bis(4-methyl-3-cyclohexenyl)-2-butene;
1,2-bis(1,4-dimethyl-3-cyclohexenyl)ethylene;
1,2-bis(5,6-dimethyl-3-cyclohexenyl)ethylene;
2,3-bis(1,3,4-trimethyl-3-cyclohexenyl)-2-butene;
1,2-bis(2,5,6-trimethyl-3-cyclohexenyl)ethylene;
1,2-bis(2,6-dimethyl-3-cyclohexenyl)ethylene;
3,4-bis(4-ethyl-3-cyclohexenyl)-3-hexene;
1-(3-methyl-3-cyclohexenyl)-2-(2-methyl-6-ethyl-3-cyclohexenyl)ethylene;
1-(3-cyclohexenyl)-2-(3-methyl-3-cyclohexenyl)ethylene;
1,2-bis(5-cyclodecenyl)ethylene;
1,2-bis(8-cyclotetracosenyl)ethylene;
1,2-bis(2-cyclobutenyl)ethylene;
1,14-bis(6-cyclotridecenyl)-7-tetradecene;
5-ethyl-4,4-bis(2-cyclopentenyl)-2-octene;
ethene;
propene;
2-methylpropene;
1-butene;
2-butene;
1-hexene;
3-dodecene;
12-pentacontene;
2-ethyl-3-methyl-1,6,10-nonadecatriene;
cyclobutene;
cyclohexene;
cyclopentene;
cyclododecene;
cyclodecene;
1,4,8-cyclododecatriene;
1,5-cyclooctadiene;
bis(3-cyclohexenyl)methane;
3,9-dimethyl-1,5,10-undecatriene;
7-methyl-3-methylene-1,6-octadiene;
2-methyl-2-butene;
3-methyl-1-butene;
2-pentene;
1-pentene;
2-hexene;
3-hexene;
2-methyl-1-pentene;
2-methyl-2-pentene;
2,3-dimethyl-2-butene;
1-heptene;
3-heptene;
4,4-dimethyl-1-pentene;
2,3-dimethyl-2-pentene;
2,3,3-trimethyl-1-butene;
1-octene;
2,4,4-trimethyl-2-pentene;
1-nonene;
1,4-pentadiene;
1,5-hexadiene;
2,6-octadiene;
3,7-dimethyl-1,6-octadiene;
4-methyl-1-cyclohexene;
4-vinyl-1-cyclohexene;
3,3,6,6-tetramethyl-1,7-octadiene;
3,3-dimethyl-1,4-pentadiene;
3-vinylcyclohexene;
4-vinylcyclohexene;
diallyl phthalate;
diallyl terephthalate;
diallyl isophthalate;
1,6,10,14,38-pentacontapentene;
2,4,6-trivinyl-8,12-tetradecadiene;
1,4,7,10-cyclododecatetraene;

styrene;
2,5-dichlorostyrene;
vinylacetate;
vinylbenzoate;
vinyl isobutyl ether;
vinyl stearate;
dibutyl fumarate;
dibutyl maleate;
1,6-difluoro-3-hexene;
1,8-diiodo-4-octene;
1,12-dibromo-4-decene;
1-methylthio-3-octene;
hexachlorocyclopentadiene-4-vinylcyclohexene adducts;
4-chloro-2-butenylbenzoate, and the like.

Any of the halogens, chlorine, bromine, or iodine can be employed to halogenate olefinic hydrocarbons according to this invention.

A suitable non-polar diluent is also essential to the process of this invention. These diluents should be nonreactive to the reaction mixture. Specific examples are carbon tetrachloride, chloroform, carbon disulfide, dichloromethane, propane, butane, 1,2-dichloroethane, trifluoromethane, various freons, and the like. Preferably, these diluents are relatively volatile so as to be easily removable from the reaction mixture.

Any Lewis acid which contains a metallic or transition element and which is capable of forming a complex with a substantially organic compound can be employed in the process of this invention. Examples of suitable Lewis acids include aluminum chloride, boron fluoride, ferric chloride, zinc chloride, stannic chloride, aluminum bromide, boron-chloride, ferric bromide, zinc bromide, stannic bromide, stannic fluoride, and the like.

Any substantially polar organic compound capable of forming a complex with a Lewis acid which contains a metallic or transition element can be employed according to the process of this invention. These polar organic compounds can have from 1 to about 25 carbon atoms, inclusive. Examples of suitable alcohols, ethers, amines, carboxylic acids, and the like include ethanol, methanol, 2-propanol, pyridine, quinoline, trimethylamine, diethylenetriamine, diethyl ether, acetic acid, propanoic acid, tetrahydropyran, tetrahydrofuran, acetonitrile, dioxane, nitroethane, nitropropane, nitrobenzene, n-butanol, pyrrolidine, triethylamine, tri-n-butylamine, and the like, and mixtures thereof.

Preferably, the Lewis acid and polar compounds of this invention form a complex. The complex can be any complex known to the art for such materials. The mole ratio of Lewis acid to polar compound can range from 1:1 to 1:25 inclusive. Preferably, however, a complex is formed in a 1:1 to 1:10 mole ratio; the relative amount of these materials to be added to the reaction mixture depends on the desired mole ratio between the Lewis acid and the polar compound.

It is critical to this invention that only sufficient polar compound be employed to form a complex with a Lewis acid, and that substantial excesses of polar compound be avoided. If an excess amount of these compounds such as alcohol is present, the products are contaminated with analogs of the halogenated hydrocarbons that contain alkoxy groups. If no polar compound is present, Lewis acids remain insoluble and do not catalyze the halogenation and/or form colored complexes with the employed olefinic hydrocarbon.

The reaction conditions of this halogenation process can vary widely. The temperatures that can be employed are in the range of —40 to 70° C., preferably in the range of —10 to 20° C. The pressures that can be employed are in the range of 0.5 to 10 atmospheres. The reaction times that can be employed are in the range of 5 minutes to 24 hours.

The ratio of reactants can also vary widely. Preferably, 0.8 to 1.2 equivalents of halogen are employed for each equivalent of olefinic compound employed, although greater or lesser amounts can be employed. Preferably, the amount of Lewis acid employed is in the range of 0.5 to 40 weight percent of olefinic compound employed and the amount of nonpolar diluent employed is in the range of 10 to 95 weight percent of the total reaction mixture employed.

If desired, a minor amount of an acid acceptor such as sodium bicarbonate, calcium carbonate, or the like, can be employed in the range of about 0.01 to 5 weight percent of the halogen employed. The halogenated material can be recovered by any means known to the art such as filtration, distillation, solvent extraction, and the like. The conversion of this invention can be effected in conventional equipment by conventional techniques. For example, the olefinic compound and non-polar diluent can be charged to a reactor. After cooling under a nitrogen atomosphere, a mixture of halogen, Lewis acid, non-polar diluent, and polar organic compound can be added. The product can be recovered by filtration under a nitrogen atmosphere and washed with a non-polar diluent.

The halogenated materials produced by this process are useful materials, for example, these halogenated hydrocarbons are highly effective flame retardants in polyolefins in low concentrations when used with antimony trioxide and an antioxidant formulation, or otherwise as disclosed in U.S. 3,331,797. In addition, other halogenated hydrocarbons produced according to this invention have well-known utility for many uses; for example, as nematocides, solvents, chemical intermediates, insecticides, and the like.

The advantages of this invention are further illustrated by the following examples. The reactants, proportions, and other specific conditions are presented as being typical and should not be construed to limit this invention unduly.

EXAMPLE I

A solution comprised of 20 grams of 1,2-bis(3-cyclohexenyl)ethylene [1] and 75 milliliters of chloroform was charged to a stirred reactor. After the solution was cooled to —5° C. under a nitrogen atmosphere, 0.3 grams of sodium bicarbonate was added. To this rapidly stirred mixture was then added a mixture comprised of 50.5 grams of bromine and 1.0 grams of anhydrous aluminum chloride in 75 milliliters of a solution comprised of 95 volume percent chloroform and 5 volume percent absolute ethanol (8:1 mole ratio of ethyl alcohol:$AlCl_3$). Rate of addition was controlled to maintain the reactor temperature at 0° C. Addition was completed in about 3 hours. The 1,2-bis(3,4-dibromocyclohexyl)-1,2 - dibromoethane product was removed by filtration under a nitrogen atmosphere and was washed with chloroform. Yield was 49 grams or 69 mole percent based on the 1,2-bis(3-cyclohexenyl(ethylene charged. The product was white powder melting at 214–217° C., and was determined to be 1,2-bis(3,4-dibromocyclohexyl)-1,2-dibromoethane.

EXAMPLE II

Two further runs were made substantially as in Example I. Solvent from the run of Example I was employed and subsequently reused a third time. The wash filtrate of the run of Example I was used as a diluent for the bromine. Respective yield of these runs utilizing recycle diluents were 90 and 96 mole percents based on the 1,2-bis(3-cyclohexenyl)ethylene charged. The products recovered had a melting point in the range of 212–217° C. and were good looking white powders which indicated that the high quality products were made with recycle.

This example and Example I demonstrate that very good yields of high quality products are produced by the process of this invention, i.e., an overall yield of 85 mole percent based on the olefinic hydrocarbon charged. The

---

[1] BCE (1,2-bis[3-cyclohexenyl]ethylene) is readily available in developmental quantities or can be synthesized by means well known to the art, e.g. U.S. 3,395,189, U.S. 3,395,190, and U.S. 3,342,884.

products were substantially free of alkoxy groups and did not discolor or corrode equipment when processed subsequent to admixing with polypropylene.

EXAMPLE III

A solution comprised of 10 grams of 1,2-bis(3-cyclohexenyl)ethylene and 75 milliliters of methanol was charged to a stirred reactor. Prior to cooling the mixture to 0° C. 1.0 gram of aluminum chloride and 1.2 grams of sodium bicarbonate were added. Over a period of 75 minutes, 25.4 grams of bromine were added under a nitrogen atmosphere, and stirring was continued for an additional hour. The precipitate was filtered, washed with methanol, washed with 2 percent sodium bicarbonate solution, and dried to yield 32 grams of product with a melting point of 145–160° C. This product differs from the product of Examples I and II as indicated by the melting point. It was determined to have a considerable quantity of alkoxy groups, and upon processing subsequent to admixture with polypropylene, discolored and caused corrosion of equipment.

EXAMPLE IV

The run of Example III was repeated, except that ethanol rather than methanol was employed. In this run, 29 grams of product having a melting point of 160–175° C. and the undesirable characteristics of the product of Example III were produced.

The runs of Example III and Example IV demonstrate that the processes of the prior art do not produce as desirable a product or as satisfactory yields thereof as the process of the instant invention.

EXAMPLE V

A reactor was charged with 98 grams of 1-heptene and 350 milliliters of chloroform. 3.1 grams of aluminum chloride, 4.0 grams of ethanol, and 2.0 grams of sodium bicarbonate were then added to the reaction mixture. Then 89 grams of chlorine were passed to the reaction mixture.

A total of 132.05 grams of 1,2-dichloroheptane was recovered by fractional distillation having a boiling point of 68–72° C., 5.5 mm. Hg, $n_D^{28}$, 1.4509. The yield was 78 mole percent based on 1-heptene charged. 4.9 grams of 1,2-dichloroheptane was determined by gas liquid chromatography to be in a heavier fraction which constituted a total yield of 82 mole percent based on the 1-heptene charged.

EXAMPLE VI

A solution of 21.6 grams of 4-vinylcyclohexene and 75 milliliters of dry chloroform was charged to a stirred reactor. After this solution was cooled to −5° C., 0.3 grams of sodium bicarbonate was added. To this rapidly stirred mixture was then added a mixture comprised of 64 grams of bromine and 1.3 grams of anhydrous aluminum chloride in 50 milliliters of a solution comprised of 95 percent chloroform and 5 percent absolute ethanol. The rate of addition was controlled to maintain the reactor at a temperature below 5° C. The addition was completed in about 3½ hours. The solution was washed with water and a 5 percent sodium bicarbonate solution. The solution was then crystallized by refrigeration. The crystals were recovered, filtered, and vacuum dried to give a yield of 75 grams of 1,2-dibromo-4-(1,2-dibromoethyl)cyclohexane, a white crystalline product with a melting point of 74.5–75.5° C. The percent yield was 88 mole percent based on the 4-vinylcyclohexene or bromine charged.

EXAMPLE VII

A solution comprised of 123 grams of diallylisophthalate and 500 milliliters of chloroform was charged to a stirred reactor. After this solution was cooled to −5° C., 4.2 grams of sodium bicarbonate was added. To this rapidly stirred mixture was then added a mixture comprised of 5.0 grams of anhydrous aluminum chloride, 250 milliliters of chloroform, 6 milliliters of absolute ethanol, and 160 grams of bromine. The rate of addition was controlled to maintain the reactor temperature below 0° C. Addition was completed in about 5 hours. The entire addition procedure was carried out in the substantial absence of light. After additional stirring, the solution was washed with distilled water and a 5 percent sodium bicarbonate solution. The organic layer was dried and the solvent was removed to leave a good yield of di(2,3-dibromopropyl) isophthalate isolated as a white solid. Recrystallization yielded 200 grams of product with a melting point of 87–90° C. The percent yield was 71 mole percent based on the diallylphthalate or bromine charged.

EXAMPLE VIII

A solution comprised of 25 grams of hexachlorocyclopentadiene-4-vinylcyclohexene adduct and 75 milliliters of chloroform was charged to a stirred reactor under a nitrogen atmosphere. After the solution was cooled to −3° C., 0.2 grams of sodium bicarbonate was added. To this rapidly stirred mixture was added a mixture comprised of 10.5 grams of bromine, 0.2 grams of aluminum chloride, 1 milliliter of ethanol, and 50 milliliters of chloroform. The rate of addition was controlled to maintain the reactor temperature below 6° C. Addition was completed in about 2 hours. After additional stirring and washing with water in 5 percent sodium bicarbonate, organic layer was separated and dried. Filtration and removal of solvent afforded 34.8 grams of product isolated as a water-white, viscous oil. The percent yield was 98 percent based on olefin or bromine charged, and the product was believed to be a mixture of the following compounds:

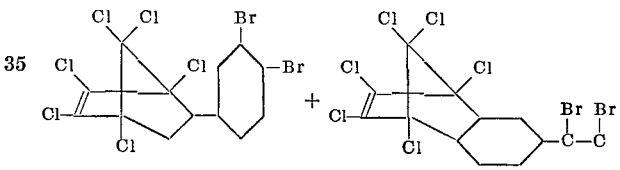

EXAMPLE IX

A solution comprised of 10 grams of 41chloro-2-butenyl benzoate and 60 milliliters of chloroform was charged to a stirred reactor. After the solution was cooled, a small amount of sodium bicarbonate was added. To this rapidly sturred mixture was then added a mixture comprised of 7.6 grams of bromine, 0.15 gram of aluminum chloride, and 1 milliliter of absolute ethanol in 25 milliliters of chloroform. The solution was warmed to room temperature and addition was completed in 9 hours. The solution was then washed with water in 5 percent sodium bicarbonate solution. The organic layer was dried and filtered, followed by removal of the solvent. The 1,2-dibromo-4-chlorobutyl benzoate product, a colorless oil, was isolated and weighed 16.9 grams.

Examples V–IX all demonstrate that very good yields of high quality products are produced by the process of this invention.

Reasonable variations and modifications are possible in the scope of this invention without departing from the spirit and scope thereof.

I claim:

1. A process for the halogenation of a material selected from the group consisting of (a) hydrocarbons containing only ethylenic unsaturation in the form of from 1 to 5 olefinic carbon-carbon double bonds which are not conjugated in addition to from zero to 4 benzene rings and (b) said hydrocarbons having from 1 to 5 moieties selected from the group consisting of —I, —Br, —Cl, and —F:

which comprises contacting said material under halogenation conditions with a halogen which is chlorine, bromine, or iodine, in a non-polar diluent nonreactive with the reaction mixture and in the presence of a catalyst system formed by admixing components comprising at least one Lewis acid and at least one polar organic compound;

wherein said Lewis acid comprises a compound of aluminum, boron, iron, zinc, or tin, wherein the anionic moiety of the Lewis acid compound is fluoride, chloride, bromide, or iodide;

wherein said polar organic compound is selected from the group consisting of ethanol, methanol, 2-propanol, pyridine, quinoline, trimethylamine, diethylenetriamine, diethyl ether, acetic acid, propanoic acid, tetrahydropyran, tetrahydrofuran, acetonitrile, dioxane, nitroethane, nitropropane, nitrobenzene, n-butanol, pyrrolidine, triethylamine, tri-n-butylamine, and mixtures thereof;

wherein said Lewis acid and said polar organic compound are employed in a molar ratio of Lewis acid: polar organic compound in the range of about 1:1 to about 1:10, and wherein said Lewis acid and said polar organic compound form a complex.

2. A process in accordance with claim 1 wherein said Lewis acid is aluminum chloride, boron fluoride, ferric fluoride, zinc chloride, stannic chloride, aluminum bromide, boron chloride, ferric bromide, zinc bromide, stannic bromide, or stannic fluoride.

3. A process in accordance with claim 2 wherein said halogenation conditions include a temperature in the range of about −40 to about 70° C., and a pressure in the range of about 0.5 to about 10 atmospheres.

4. A process in accordance with claim 3 wherein said Lewis acid comprises aluminum chloride and wherein said polar organic compound comprises ethanol.

5. A process in accordance with claim 1 wherein said hydrocarbons are cyclic hydrocarbons containing only ethylenic unsaturation.

6. A process in accordance with claim 5 wherein said Lewis acid is aluminum chloride, boron fluoride, ferric fluoride, zinc chloride, stannic chloride, aluminum bromide, boron chloride, ferric bromide, zinc bromide, stannic bromide, or stannic fluoride.

7. A process in accordance with claim 6 wherein said halogenation conditions include a temperature in the range of about −40 to about 70° C., and a pressure in the range of about 0.5 to about 10 atmospheres.

8. A process in accordance with claim 7 wherein said Lewis acid comprises aluminum chloride and wherein said polar organic compound comprises ethanol.

9. A process in accordance with claim 8 wherein said material comprises 1,2-bis(3-cyclohexenyl)ethylene.

10. A process in accordance with claim 1 wherein said material comprises 1,2-bis(3-cyclohexenyl)ethylene.

References Cited

UNITED STATES PATENTS 3,223,755  12/1965  Rimmer _____ 260—660

DANIEL D. HORWITZ, Primary Examiner

U.S. Cl. X.R.

260—649 C, 650 R, 660, 475 N, 488 R, 476 R, 410, 485 H, 614 A, 609 A, 583 G, 563 R, 568, 648 F, 653